US010587907B2

(12) United States Patent
Corl et al.

(10) Patent No.: US 10,587,907 B2
(45) Date of Patent: Mar. 10, 2020

(54) BROADCAST MANAGEMENT SERVICES PLATFORM

(71) Applicant: TRIVENI DIGITAL INC., Princeton, NJ (US)

(72) Inventors: Mark T. Corl, Princeton, NJ (US); Mark F. Simpson, Princeton Jct., NJ (US)

(73) Assignee: TRIVENI DIGITAL INC., Princeton, NJ (US)

( * ) Notice: Subject to any disclaimer, the term of this patent is extended or adjusted under 35 U.S.C. 154(b) by 0 days.

(21) Appl. No.: 15/489,405

(22) Filed: Apr. 17, 2017

(65) Prior Publication Data

US 2017/0302982 A1 Oct. 19, 2017

Related U.S. Application Data

(60) Provisional application No. 62/323,337, filed on Apr. 15, 2016.

(51) Int. Cl.
| *H04N 21/2662* | (2011.01) |
| *H04N 21/643* | (2011.01) |
| *H04N 21/24* | (2011.01) |
| *H04N 21/61* | (2011.01) |
| *H04N 21/462* | (2011.01) |
| *H04N 21/258* | (2011.01) |

(52) U.S. Cl.
CPC ..... *H04N 21/2662* (2013.01); *H04N 21/2407* (2013.01); *H04N 21/4622* (2013.01); *H04N 21/6112* (2013.01); *H04N 21/64322* (2013.01); *H04N 21/25833* (2013.01)

(58) Field of Classification Search
CPC .......... H04N 21/2662; H04N 21/2407; H04N 21/4622; H04N 21/6112; H04N 21/64322; H04N 21/25833
See application file for complete search history.

(56) References Cited

U.S. PATENT DOCUMENTS

| 8,838,824 B2 * | 9/2014 | Jabri | H04L 47/38 |
| | | | 709/203 |
| 2008/0195761 A1 * | 8/2008 | Jabri | H04L 65/605 |
| | | | 709/250 |
| 2013/0007226 A1 * | 1/2013 | White | H04L 65/4076 |
| | | | 709/219 |

(Continued)

FOREIGN PATENT DOCUMENTS

WO    WO 2015144850 A1 * 10/2015  ......... H04N 21/2385

*Primary Examiner* — Chenea Davis
(74) *Attorney, Agent, or Firm* — Howard IP Law Group, PC

(57) ABSTRACT

A system for selectively controlling the distribution of media content to at least one client device over a plurality of distribution channels is provided. The system includes one or more broadcast management processors configured to receive feedback data including a usage metric corresponding to at least one of a characteristic associated with the at least one client device and a characteristic associated with at least one of the plurality of distribution channels. The broadcast management processor is further configured to determine an alternate data rate associated with at least one of the plurality of distribution channels based on the received usage metric, and generate at least one distribution control signal indicative of the alternate data rate.

20 Claims, 9 Drawing Sheets

(56) References Cited

U.S. PATENT DOCUMENTS

| | | | |
|---|---|---|---|
| 2015/0341646 A1* | 11/2015 | Sze | H04N 19/166 |
| | | | 375/240.26 |
| 2016/0286249 A1* | 9/2016 | Phillips | H04N 21/2385 |
| 2017/0244924 A1* | 8/2017 | Shintani | H04N 5/46 |

* cited by examiner

BROADCAST MANAGEMENT SERVICES PLATFORM

CROSS-REFERENCE TO RELATED APPLICATION

This application claims the benefit of and priority to U.S. Provisional Patent Application Ser. No. 62/323,337, filed Apr. 15, 2016, the entire disclosure of which is incorporated by reference herein for all purposes.

FIELD OF THE INVENTION

The present invention relates generally to systems and methods for managing the delivery of media content over multiple discrete distribution channels.

BACKGROUND

Data distribution channels used to deliver content to remote receivers, such as over-the-air (OTA) broadcasts, broadband (i.e., the internet), and multi-program video distribution (MVPD, e.g. cable and/or satellite), are currently each managed by independent systems within distinct business "silos", often by separate companies. This has been necessitated by the use of distinct and incompatible technologies required to supply content over each of the corresponding independent distribution channels, including communication protocols used to deliver the content to an end user or client. For example, broadband channels utilize internet protocol (IP), while broadcast channels utilize MPEG2 Transport Stream.

Existing control architectures also lack the ability to effectively optimize content distribution over a given channel. Currently, these systems and their operators rely on static configurations based on experience and goals of human management and historic customer feedback provided a significant amount of time after the content is broadcast or delivered. As the number and complexity of distribution paths increase over time, human actors will no longer be able to accurately predict the optimal means of content delivery. Further, broadcasters currently have limited visibility into how clients wish to consume and view content utilizing the advanced features of receivers. While this issue has been resolved to some degree by internet-connected devices, currently collected data is used primarily to report consumption, rather than to optimize content delivery.

As a result of the isolated nature of existing content distribution channels and associated control architectures, no systems exist which are capable of altering distribution over multiple channels based on this consumption data. This technological challenge is particularly problematic as the number of mobile receivers (e.g. smart phones and any wifi-enabled mobile device) receiving media content rapidly grows, varying the demand placed on specific distribution channels throughout a given day.

Accordingly, a technological solution, such as a centralized system configured to manage and deliver media content and other data selectively over a plurality of discrete distribution channels, with data selection responsive to one or more factors, is desired.

SUMMARY

In some embodiments, the foregoing technological challenges relating to distribution of content over multiple available distribution channels having varied control architectures are addressed by technological solutions. The solutions include broadcast management processors configured as described below.

According to an embodiment of the present disclosure, a system for selectively controlling the distribution of media content to at least one client device over a plurality of distribution channels is provided. The system includes one or more broadcast management processors configured to receive feedback data including a usage metric corresponding to at least one of a characteristic associated with the at least one client device and a characteristic associated with at least one of the plurality of distribution channels. The broadcast management processor is further configured to access a data rate associated with at least one of the plurality of distribution channels, and determine an alternate data rate associated with the at least one of the plurality of distribution channels based on the received usage metric, and generate at least one distribution control signal indicative of the alternate data rate. The alternate data rate is indicative of an alternate characteristic of one or more of the content itself (e.g., quality), the type or types of distribution channels utilized to distribute the content (e.g., a data rate of zero corresponding to the disablement of a given distribution channel), and characteristics of the distribution channel(s) themselves (e.g., bandwidth). In one particular embodiment, the broadcast management processor is configured to compare the received usage metric to one or more predetermined threshold values. If the usage metric exceeds the predetermined threshold value, the broadcast management processor is configured to generate at least one distribution control signal for selectively distributing content data to the client device via at least one of the plurality of distribution channels and/or for altering a characteristic of the distribution of content. As set forth above, this characteristic may be embodied as change in a data rate associated with one or more channels. In embodiments, these distribution channels include at least a broadband channel and an OTA broadcast channel.

According to another embodiment of the present disclosure, a system for selectively distributing content to a client device over one or more of a plurality of distribution channels including a broadband distribution channel and an OTA broadcast distribution channel is provided. The system includes a broadcast management processor operative to receive usage metrics associated with the client device, receive data associated with a characteristic of one of the plurality of distribution channels, and access a current distribution scheme. Using the received usage metrics and data associated with a characteristic of one of the plurality of distribution channels, the processor is further operative to determine an optimal or alternate distribution scheme for distributing content over the plurality of distribution channels. An output signal indicative of the determined alternate distribution scheme may be generated and provided to a control system or application associated with one or more of the distribution channels for performing this reconfiguration.

In another embodiment, a computer-implemented method for selectively distributing content to a client device over one or more of a plurality of distribution channels including a broadband distribution channel and an OTA broadcast distribution channel is provided. The method includes receiving usage metrics associated with the client device and receiving data associated with a characteristic of one of the plurality of distribution channels, and accessing, by the one or more broadcast management processors, a data rate associated with the at least one of the plurality of distribution channels. Based on the received usage metrics and data associated with a characteristic of one of the plurality of distribution channels, an alternate or optimal distribution scheme for distributing content over the plurality of distribution channels is determined.

According to a further embodiment of the present disclosure, a client device for selectively controlling the selection of a distribution channel that will be used to receive media content is provided. The device includes one or more client device processors, a memory in communication with the processors and storing program instructions, the one or more processors operative with the program instructions to: 1) provide, to a remotely-located broadcast management processor, a usage metric corresponding to at least one of a characteristic associated with the client device and a characteristic associated with at least one of the plurality of distribution channels available to receive media content, wherein said usage metric exceeds a predetermined threshold value associated with current characteristics of an initial distribution channel; and 2) receive said media content via a distribution channel distinct from the initial distribution channel.

DETAILED DESCRIPTION

Figure 1:
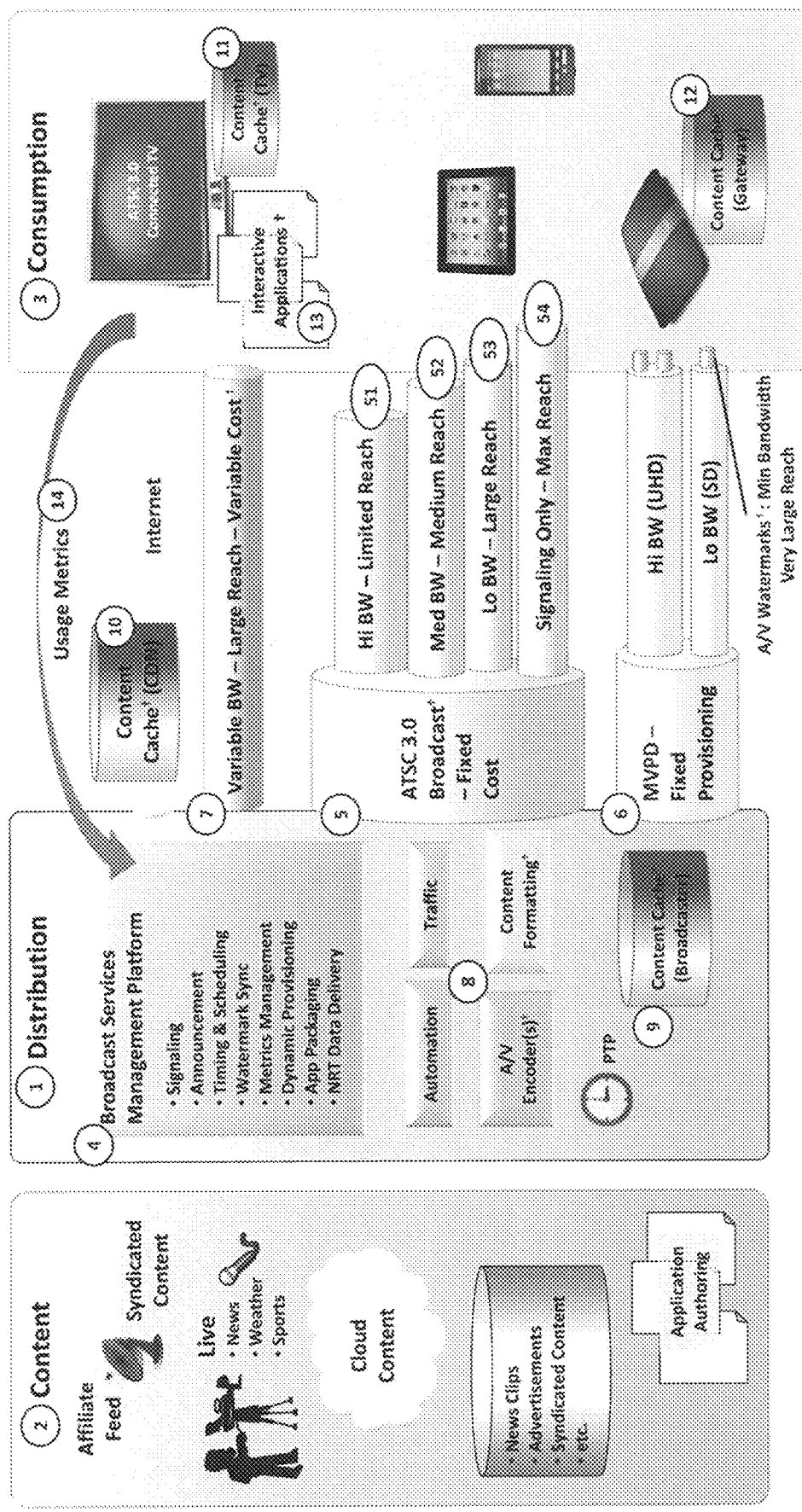
FIG. 1 is a system diagram illustrating an environment in which a broadcast services management platform according to embodiments of the present disclosure operates.

It is to be understood that the figures and descriptions of the present invention have been simplified to illustrate elements that are relevant for a clear understanding of the present invention, while eliminating, for purposes of clarity, many other features found in computer and communication systems, including broadcast, cellular, telco, broadband and cable/satellite media delivery systems. However, because such elements and processes are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the inventions may be practiced. It is to be understood that the various embodiments of the inventions, although different, are not necessarily mutually exclusive. Furthermore, a particular feature, structure, or characteristic described herein in connection with one embodiment may be implemented within other embodiments without departing from the scope of the inventions. In addition, it is to be understood that the location or arrangement of individual elements within each disclosed embodiment may be modified without departing from the scope of the inventions. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

As used herein, the term "processor" broadly refers to and is not limited to a single- or multi-core general purpose processor, a special purpose processor, a conventional processor, a Graphics Processing Unit (GPU), an Applications Processing Unit (APU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Disclosed herein are processor-executable methods, computing systems, and related processing for controlling the distribution of media content over a plurality of discrete distribution channels, such as broadband, OTA, and MVPD, using a shared, centralized control system. By way of background, broadcasting standards are now emerging that utilize internet protocol (IP) as the basis for primary content transportation on most distribution channels. With these standards implemented, IP may be utilized as the common transport protocol that all physical distribution networks ultimately deliver. Between different types of content, end user or consumer devices or "clients" may use "converged stacks", that is, layers of software that differ only at the very physical carrier layer but use the same technologies at higher layers. Accordingly, with clients soon to be processing data similarly from multiple distribution channels, embodiments of the present disclosure enable the delivery of a single set of content over multiple paths for seamless consumption by clients regardless of how it was received. In addition, more and more clients are becoming connected to the internet, offering an efficient means to collect metrics on what is being viewed and other parameters collected by the client. In this way, the advent of clients with converged stacks and feedback capability provides a technical environment that previously did not exist.

Embodiments of the present disclosure include an improved broadcast management platform and system architecture for managing the transmission of media content over numerous types of transmission systems and formats. In one embodiment, a distribution platform is configured to provision pipelines and caches for transmission, selectively preposition content for available caches, configure subsystems including encoders and segmenters, and control devices such as routers, video switches, satellite transponders, and storage systems.

More specifically, a broadcast services management platform (BSMP) according to an embodiment of the present disclosure defines a set of software processes or modules configured to dynamically manage or control a plurality of content distribution channels. Content to be distributed over the channels may include video, audio, captions, interactive applications or content, support files and any other data for meeting particular business objectives. In one embodiment, each of the distribution channels has distinct delivery characteristics that may be constrained by the various underlying physical mechanisms over which the channels operate. For example, distribution channels operating under Advanced Television Systems Committee (ATSC) 3.0 protocols may offer different operating points that must be configured.

The BSMP according to embodiments of the present disclosure controls and configures both the operating points of each distribution channel, as well as what content is distributed over each channel. Control of the system is achieved via the consideration and application of a combination of various predetermined business rules (e.g., predicted revenue, target demographics, etc.), consumption metrics or other feedback reported by content-consuming clients, and cost considerations, capabilities and configurations of each channel. This control and configuration may be performed dynamically, following historical trends and real-time consumption information and changes in business rules and costs.

The BSMP according to embodiments of the present disclosure is configured to optimize content distribution according to content and/or channel attributes or characteristics. For example, in the exemplary ATSC 3.0 case, the BSMP is configured to commission and decommission whole sub-channels as necessary. As the mechanisms of commissioning or decommissioning a sub-channel are dependent the distribution channel type, the BSMP will be pre-configured to perform the appropriate operations for manipulating a given channel. The BSMP is further configured to dynamically select content for distribution over one or more channels based on, for example, capability, cost and consumption through each channel. The BSMP collects historical data to enable configuration and distribution based on trends. In embodiments, the BSMP may employ one or more computer-implemented predictive models that weight the distribution and staging models to further optimize the managed channels and the content being delivered over them. Predictive models of the present disclosure may include one or more of neural networks, Bayesian networks (such as Hidden Markov models), expert systems, decision trees, collections of decision trees, support vector machines, or other systems known in the art for addressing problems with large numbers of variables. In embodiments, the predictive models may be trained on prior data and outcomes using a historical database.

The BSMP according to embodiments of the present disclosure is configured to collect diverse client usage data or metrics in order to optimize the delivery paths used. In this way, data being used to measure client-side applications works in lock-step with systems according to embodiments of the present disclosure to describe available resources on an individual receiver and the distribution channels used by that receiver. The combination of data from the population of receivers allows the BSMP to manage where and how content is delivered and stored most efficiently to reach the largest audience for the least cost at any specific time.

Referring generally to FIG. 1 a high-level system diagram illustrating the working environment of a BSMP 4 according to embodiments of the present disclosure is shown. The environment may generally be described as including a distribution section 1, a content section 2 and a consumption section 3. Content section 2 comprises various sources of content including, but not limited to, satellite feeds from networks (affiliate feed) or syndicated sources, live cameras and microphones, cloud sources of content files, and local archives of news footage and advertising. Content section 2 provides content to distribution section 1. Distribution section 1 is configured to selectively and optimally provide content to consumer section 3 via a plurality of discrete distribution channels, including a broadband (i.e. internet) channel 7, an ATSC 3.0 broadcast system channel 5, and an MVPD channel 6. Distribution section 1 includes components 8 typically found in broadcast studios that have a direct relationship with BSMP 4. More specifically, depending on the particular environment, these components may be controlled through configuration (e.g., A/V encoders, content formatting), directly provide configuration and schedule information (traffic), or provide real-time control information (e.g., automation, PTP). While components 8 of distribution section 1 may typically be located within a given broadcast station studio, a single physical location is not required. Any or all components 8 may be distributed, support single or multiple broadcasts or any combination. Consumption section 3 illustrates various consumer content-receiving clients or devices within a given broadcast area, which may include TVs (and associated set-top boxes), smart phones, tablets, gateway devices and any mobile device enabled to receive such signals.

BSMP 4 is configured to interact with components 8, such as automation and traffic systems which manage scheduling and billing, encoders for audio and video and various other content formatting systems, such as DASH packaging, ROUTE encoding or MPEG2 transport multiplexing systems. In one embodiment, BSMP 4 is configured to utilize the encoders and content formatting systems to manage video compression attributes and formatting constraints to either improve quality, thereby employing additional bandwidth and transmitting at a higher data rate, or reduce bandwidth, thereby transmitting at a lower data rate and reducing quality, depending on the needs of the system at any instant. BSMP 4 and components 8 of distribution section 1 may be operatively connected to a UTC-based clock, represented herein as precision time protocol (PTP), for delivering clock signals to all components 8 over network connections for facilitating synchronization.

As set forth above, BSMP 4 is configured to manage content delivery over a plurality of discrete distribution channels, including an ATSC 3.0 broadcast system channel 5. As will be understood by one of ordinary skill in the art, particular sets of ATSC 3.0 over-the-air broadcasting standards or protocols (e.g. ATSC A/332 and A/331) provide a means of defining multiple physical layer pipes (PLPs) or pipelines, each with different reception characteristics. Each PLP can be configured at a specific operating point with known reception capabilities. This may be accomplished by trading off forward error correction (FEC) against content bandwidth, wherein the greater number of bits used for FEC, the less are used for content. The FEC of a PLP indicates its ability to be received, or the "reach" of the signal. These discrete PLPs 51,52,53,54 each comprise varying reach and bandwidth capability. For example, high bandwidth (Hi BW) PLP 51 has relatively limited reach, low bandwidth (Lo BW) PLP 53 has a relatively large reach, and medium bandwidth (Med BW) PLP 52 comprises an intermediate reach. The system further supports sending extremely low bandwidth signaling information over a very robust signal-only PLP 54, allowing the broadcaster to reach a maximum number of devices which, in turn, can pull the broadcaster's content from broadband. Low bandwidth signaling information carry descriptions of all other PLPs and the services they carry. In this way, a robust distribution channel carrying discovery signaling for other channels is achieved, and receivers are provided with channel information despite not being able to physically receive given referenced PLPs.

BSMP 4 according to embodiments of the present disclosure is configured to manage characteristics of multiple PLPs of ATSC 3.0 broadcast system channel 5 simultaneously to target various classes of receiving device. For example, one PLP may be configured to target audio transmissions at devices in vehicles, while another PLP is configured to target in-home reception on 4K large screen smart TVs. BSMP 4 is configured to provision PLPs and content destined for each of the PLPs based on a variety of factors, including but not limited to, business rules and client feedback or usage metrics 14. Usage metrics 14 may include, for example, the number and type of client devices receiving the content. A listing of exemplary factors, including usage metrics and business rules is provided in Table 1.

BSMP 4 is further configured to manage various MVPDs channels 6, such as any managed cable, telco and satellite content streams. As would be understood by one of ordinary skill in the art, existing MVPD channels may have contractually-constrained delivery parameters that will likely be different for each client contract. Furthermore, as part of their delivery technologies, many MVPD channels will remove all signaling and data outside of the basic content essence, namely, the audio, video and closed captioning streams. The result is that a consumer device is likely only to receive basic essence (audio and video) streams without any additional information.

To overcome these restrictions, in one embodiment of the present disclosure, BSMP 4 is configured to generate control signals for operating a watermarking subsystem in order to insert signaling information in the audio and video data. This allows data to be transmitted to client devices without being lost to the MVPD distribution channel technology. BSMP 4 according to embodiments of the present disclosure may be configured to manage the content of the watermarks and to place recovery information where it can be accessed using broadband. This information must be made consistent throughout the environment and reflect the other distribution channel usage.

BSMP 4 is further configured to manage characteristics of distribution over an internet or broadband channel 7. While being the most flexible in terms of the delivery and configuration, broadband channel 7 is subject to variable costs that are frequently directly related to data usage. BSMP 4 is configured to perform a continuous cost/benefit analysis of using the various broadcast pipes versus sending the content over broadband, or a combination of both. BSMP 4 is configured to frequently publish various signaling and data elements to the internet for broadband access because these data are relatively small and used by many devices. BSMP 4 may be configured to decline to stream the best quality video, for example, due to the prohibitive bit costs of the Internet Content Distribution Network (CDN) being used. In this instance, a lower-quality, smaller representation of the content would be sent to broadband channel 7 while the higher quality representation would be distributed over broadcast.

Still referring to FIG. 1, a plurality of caches may be placed in strategic positions throughout the environment. These caches may include a broadcaster content cache 9, a CDN content cache 10, a smart TV content cache 11 and a gateway content cache 12. BSMP 4 is configured to optimize its usage of each distribution channel by prepositioning content in these various caches. Positioning content on consumption side caches may rely on signaling currently defined in the ATSC 3.0 standards that informs capable receivers when data will be distributed for storage vs. playback. Content may be associated with flags or metadata indicative of low time sensitivity, which BSMP 4 is configured to interpret as indicative of such content being suitable for prepositioning. By way of example, content such as advertising, prerecorded features (e.g., features regarding a player, team, venue or the like in the context of sports programming) may be tagged or flagged as having low time sensitivity, in contrast to live game feeds, which have a high time-sensitivity. The storage and usage of content on the receiver is controlled by interactive applications 13 which are also delivered as data over broadcast or broadband. BSMP 4 may place content in the various caches and make it available for consumption in conjunction with interactive applications 13. Interactive applications 13 are configured to inform BSMP 4 when content has been used and if new content must be delivered through the use of usage metrics and purpose-built communication protocols. BSMP 4 is thus extended into each client by including management utilities in interactive applications 13. In this way, BSMP 4 is operating both within the broadcast studio and in each client to optimize delivery of content in the most efficient and cost effective way for the overall client base, the service provider and/or the content owner(s).

Figure 2:
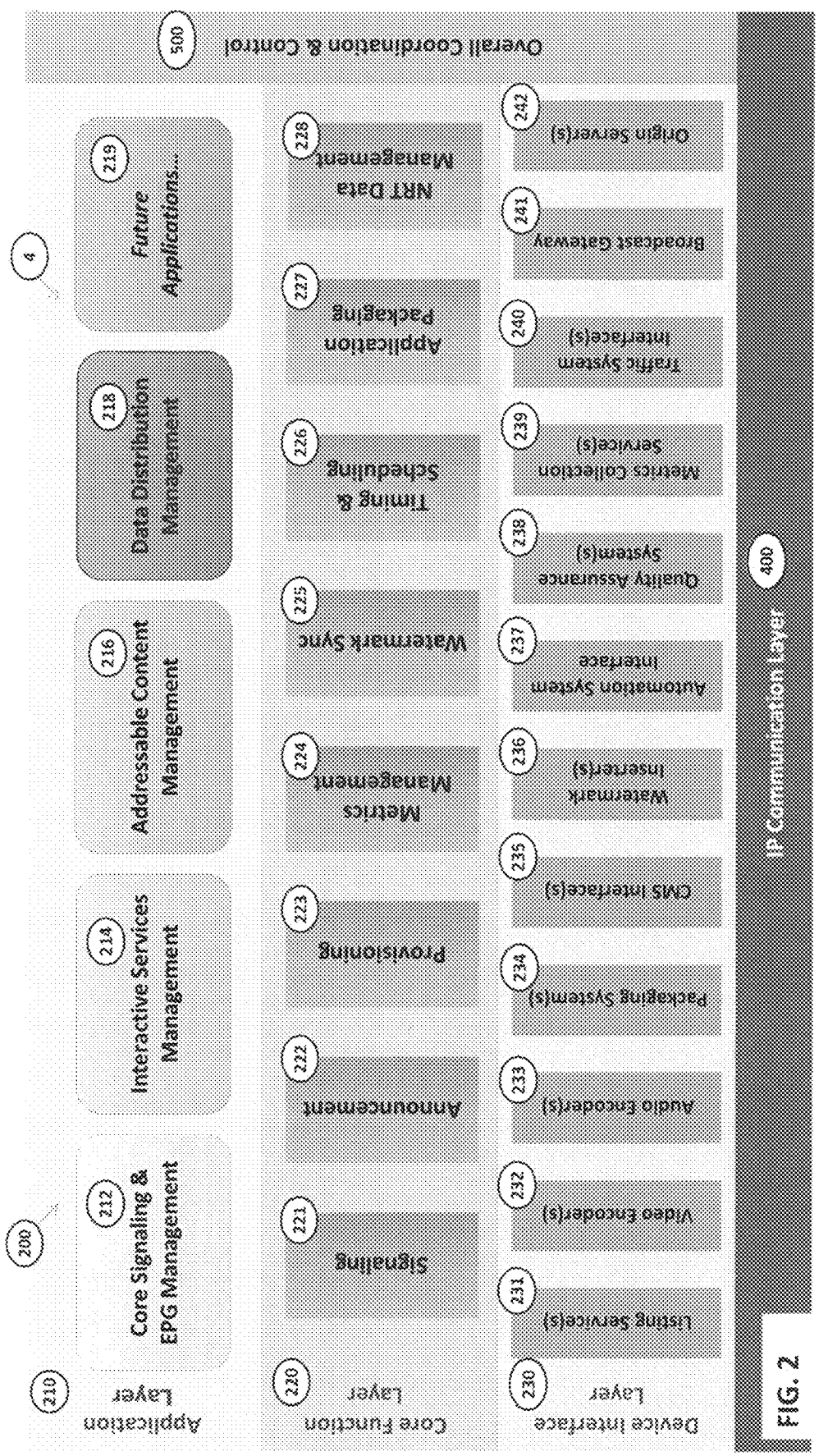
FIG. 2 is a high-level diagram illustrating the layered applications used to enable the operation of a broadcast services management platform according to embodiments of the present disclosure.
Figure 3:
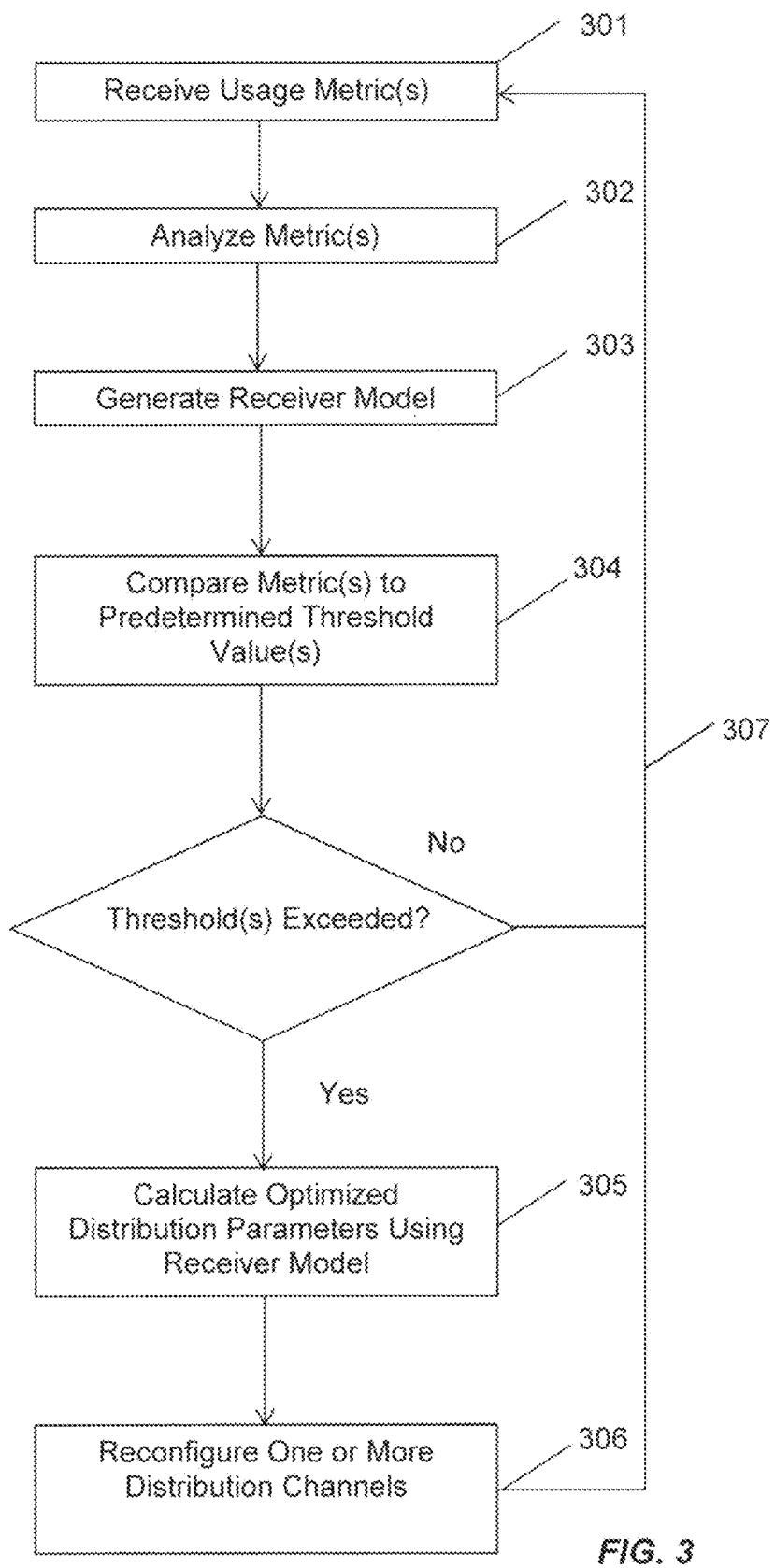
FIG. 3 is a flow diagram illustrating a distribution channel optimization process performed by a broadcast services management platform according to embodiments of the present disclosure.

Referring generally to FIG. 2, a layer diagram is provided illustrating a conceptual software architecture 200 of BSMP 4 according to an embodiment of the present disclosure. Architecture 200 generally comprises an application layer 210, a core function layer 220, a device interface layer 230, an IP communication layer 400, and an overall coordination and control module or layer 500.

Application layer 210 includes a plurality of vertical applications or modules that combine BSMP 4 functions into a task that would nominally be controlled by a user. In one embodiment, each vertical application will likely have a unique user interface associated therewith that focuses on the task to be accomplished. However, any and all applications may also interact directly with outside systems (e.g., ad management systems) to accomplish a task without need for a separate user interface.

In one exemplary embodiment, application layer 210 includes one or more core signaling and electronic program guide (EPG) management applications 212. Core signaling and EPG application 212 is configured to provide a means for a user to delineate various system-wide objects within BSMP 4, such as PLPs, programming services including video and audio streams, etc., and to manage the schedules appropriate to each of those services. Core signaling and EPG application 212 is further configured to allow levels of detail to be selected for the EPG, such as descriptions and images for the program element as well as identifying promotional material and media clips to be transmitted through applicable distribution channels. Core signaling and EPG application 212 may further be configured to interact with studio emergency alert systems, providing signaling in response to alerts for each distribution channel as appropriate.

Application layer 210 further includes an interactive services management application 214 configured to enable a user to define delivery of interactive content and related media. Generally, interactive content will accompany regular content and will be scheduled automatically when detected by BSMP 4. However, interactive services management application 214 defines a set of rules behind that scheduling, the relative priority of the interactive content to other data managed by BSMP 4, as well as where content can be accessed. Interactive services management application 214 is further configured to work with various functions to integrate watermarking workflow and event triggering.

An addressable content management application 216 of application layer 210 is configured to pre-position and schedule content utilized by, for example, a client receiver running ATSC 3.0. Addressable content management application 216 is further configured to provide reports regarding which addressable content was used by the various receivers based on usage metrics collected. This information may also be routed to traffic systems for billing purposes.

A data distribution management application 218 is configured to interface with a non-real time (NRT) data management function 228 to select arbitrary files (i.e. files with no association to the broadcast or content being sent) for delivery over the plurality of distribution channels. Data distribution management application 218 is configured to specify a priority to a given content file, along with a possible schedule. Data distribution management application 218 is configured to deliver a companion receiver-side module for managing the disposition of content files on the receiver side. Finally, application layer 210 of BSMP 4 has provisions for the addition of future applications 219. Examples of such future applications include, but are not limited to, a public broadcast system (PBS) pledge drive support application or an enhanced local news production application. These applications would use the underlying basic functions to create new workflows for customers.

Still referring to FIG. 2, core function layer 220 of architecture 200 comprises a set of software modules that provide basic functions which may be used by the various modules of application layer 210 to accomplish a given task. Multiple applications may utilize a single core function simultaneously. These core functions, in turn, utilize one or more device interfaces of device interface layer 230 to realize the function they are required to perform. In this way, applications of layer 210 need only interface with these core functions to perform tasks, rather than with any devices operatively connected to device interface layer 230.

Exemplary core function layer 220 includes a signaling module or application 221 configured to utilize system configuration parameters for each distribution channel to generate the appropriate metadata for that channel. Metadata are data structures sent over a given distribution channel that describe how to discover other metadata and the actual content being sent. More specifically, in some instances, the same data must be formatted differently to be placed in different distribution channels. For example, ATSC 3.0 broadcast signaling has a replacement component that is sent to the broadcaster's origin server so that receivers connected to an MVPD distribution channel can obtain the correct metadata. Signaling module 221 further provides interfaces to other modules, such as announcement module or application 222, watermark synchronization module or application 225 and time and scheduling module or application 226 to both gain input data and provide information needed by those functions.

The various distribution channels provide a means of sending metadata or announcement data describing the upcoming programming schedule. Accordingly, announcement module 222 is configured to receive inputs from corresponding devices communicating via a listing device interface 231, automation systems interface 237, traffic systems interface 240 and signaling module 221 for generating metadata appropriate to each distribution channel. Announcement module 222 is further configured to interface with data distribution management module 228 to send metadata files and any extended promotional information for the current and upcoming programming events to the appropriate distribution channels.

Core function layer 220 further comprises a provisioning module or application 223 configured to provide overall control of the distribution channel provisioning. Provisioning module 223 manages the constraints and capabilities of the various channels informing the applications if their requests for various channel characteristics can be supported and, if so, communicating with a broadcast gateway interface 341 and an origin server interface 342 to accomplish the desired provisioning. A metrics management module or application 224 functions to communicate with a plurality of metrics collection services being used by broadcasters to collect usage metrics data from receivers via metrics collection services interface(s) 239. Metrics management module 224 is further configured to provide summary information to the other functions and applications of the system, allowing them to decide how various distribution channels can be optimized.

Core function layer further comprises a watermark synchronization module or application 225 configured to gather appropriate timing and scheduling data from a timing and scheduling or synchronization module or application 226, as well as signaling information from signaling module 221 to control data being injected or inserted by one or more watermark inserter devices via watermark inserter interface(s) 236. A timing and scheduling or synchronization module or application 226 provides a central location to reconcile all timing with internal functions and external devices and systems. In one embodiment, it is configured to provide basic scheduling information derived from traffic and automation systems via traffic system interfaces 241 and automation system interfaces 237.

Most public systems require specific packaging and signing to guarantee secure delivery. For example, ATSC 3.0 has very specific packaging and signing requirements for distributing application packages intended to run on ATSC 3.0 receivers. Accordingly, an application packaging module or application 227 is provided and configured to communicate with signing authorities to package and sign various components that are then used to provide interactive content within an ATSC 3.0 receiver, for example. Application packaging module 227 must be programmed with delivery requirements of a given application and partition the associated files into perhaps multiple, signed packages depending on file size and other parameters. Application packaging module 227 is further configured to determine the optimal distribution path for each package and may decide to send a given package over broadcast, broadband or both. Application packaging module 227 communicates with many other functions and device interfaces to perform these tasks.

NRT data management module 228 is utilized by a plurality of other modules and applications to send data to both the broadcast and broadband distribution channels. NRT data management module 228 is configured to receive requests to send referenced data and other parameters that form a delivery priority and schedule. Data management module 228 is further configured to communicate with provisioning module 223, broadcast gateway interface 241 and origin server interface 242 to transmit the referenced data. NRT data management module 228 may also work with the various encoder interfaces to adjust or reduce encoding rates to allow space for NRT data transmissions. These requests will be heavily gated through an overall coordination and control system 500 to avoid violating any business rules.

The illustrated device interface layer 230 encompasses a representative portion of interfaces to various devices and systems that perform specific functions on behalf of or provide input to the BSMP. Many of these interfaces are proprietary to the systems interfaced with and may change over time. These modules provide a consistent interface to core function layer 220. It should be understood that only a number of exemplary device interfaces are illustrated, and further, that there may be multiple instantiations of each module or interface type to support a different device or system. For example, the control interfaces to video encoders are typically proprietary and are varied from manufacturer to manufacturer.

Exemplary device interface layer includes a listing services interface(s) 231 for interfacing with a remote database containing a schedule of upcoming programs. Historically, these services supplied the data that was used by newspapers to publish the future TV schedule. Present systems include not only the programming schedule, but also promotional material such as images, short video clips, and descriptions associated with each program episode as well.

BSMP 4 is configured to communicate with control interfaces 232 of any video encoders feeding the system. BSMP 4 may choose to include various encoding parameters to, for example, make higher or lower bit rate encodings available, add or remove a video layer, add or remove entire streams, select alternative input content and determine the constraints of the encoder when selecting these parameters. The system will also have an interface to signal the time of content breaks to support ad or content insertion.

Likewise, BSMP 4 is further configured to communicate with control interfaces 233 of any audio encoders feeding the system. BSMP 4 is configured to select various encoding parameters to, for example, make higher or lower bit rate encodings available, chose types of audio encoding such as immersive, add or remove tracks, add or remove language streams, select alternative input content and determine the constraints of the encoder when selecting these parameters. The system will also have an interface to signal the time of content breaks to support ad or content insertion.

The output of the various encoders passes into a packaging system which is controlled through interface 234. Packing systems format the encoded stream into the appropriate output format for the particular distribution path. This allows encoders to emit one format while the packaging system can emit multiple formats of the same source. BSMP 4 is configured to select various packaging parameters such as which encoded stream to package in which formats, the segment size for DASH-formatted streams, and where files should be published if they are destined for broadband delivery. The system will also have an interface to signal the time of content breaks to support ad or content insertion.

Content management system (CMS) interface(s) 235 communicates with local, remote or cloud-based CMSs. CMS interface 235 allows content to be identified as a source for encoding or packaging, depending on the source.

BSMP 4 is further configured to communicate information regarding the semantic content of the streams. This information is added to the stream(s) by watermark inserters via interface 236. Timing information and various codes are synchronized with signaling to allow client receivers to reconstruct the metadata associated with the broadcast after it has been stripped away by the MVPD or ATSC 1.0 distribution paths.

An automation system associated with interface 237 is configured to provide a real-time control system that instructs devices throughout the broadcast studio when to perform certain activities. The schedule run by the automation system is nominally derived from data supplied by the traffic system. BSMP 4 must take schedule events and convert them to actionable controls to the various systems and functions it controls.

Quality assurance system (QAS) interface(s) 238 are used to send configuration information for verification by one or more QASs. QAS interface(s) 238 may also return quality information gleaned from analyzing the overall distribution paths. This information can be used as one of the optimization facets used by BSMP 4. Receiver systems and other clients report information about service usage and user behavior to a centralized a metrics collection services system via interface 239. These services aggregate the information from a large number of clients and provide summary data.

Traffic system interface(s) 240 enables communication with one or more traffic systems providing a schedule of advertising and content that should be played at a given time. This schedule is typically created by broadcast studio scheduling and sales departments. This schedule is sent to the automation system, which converts it into specific device instructions, as well as to BSMP 4 which calculates the most optimal distribution paths to fulfill the advertising and content scheduling requirements. As many traffic systems are also responsible for billing, BSMP 4 is further configured to log information to the traffic system when ads are run. Details of specific ad replacements are also summarized by metrics management function 224 which uses traffic system interface(s) 240 to send the data to each traffic system.

Broadcast gateway interface(s) 241 are used in the ATSC 3.0 distribution architecture and accepts various input IP traffic, formats them and routes them to the appropriate PLP outputs. This interface controls the number of PLPs, what content is destined for each, and the parameters of each PLP. Origin server interface(s) 242 communicate with servers, such as HTTP-based servers, configured to make content public on the internet. BMSP 4 is configured to publish metadata, encoded AN and other files to origin servers to make them available over the broadband channel. Each origin server will have a cost of storage and access that is known to BSMP 4.

Still referring to FIG. 2, BSMP 4 according to embodiments of the present disclosure operates using IP-based protocols (HTTP, FTP, UDP, TCP, etc.) to communicate with external devices and systems over IP communication layer 400. Various layers within BSMP 4 may be distributed across multiple execution platforms but will communicate using IP. Further, architecture 200 comprises an overall coordination and control application or module 500 that spans all of the software layers of the BSMP. This module contains the configuration and control used by all layers, as well as stores many of the business rules and constraints (e.g. threshold limits used to optimize distribution) with which each component must comply. In this way, each component of BSMP 4 communicates with overall coordination and control application 500 to obtain these rules and constraints as necessary to accomplish their particular function.

BSMPs according to embodiments of the present disclosure consider usage metrics, such as the number and type of devices tuning in to receive media content or the cost of transmitting over a given channel (i.e. data rates over a broadband channel), in order to optimize content distribution. These usage metrics may be compared against one or more threshold values. For example, an exemplary threshold value may comprise a ratio of a number of mobile receivers (e.g. internet-connected phones, tablets or other devices) to stationary receivers (e.g. TVs or computers). Similarly, a threshold value may comprise a predetermined data rate. Embodiments of the present disclosure may alter the distribution of content among various distribution channels if one or more of these thresholds are exceeded. Likewise, an exemplary threshold parameter may comprise a single composite value indicative of a combination of factors, such as a value indicative of both a number and/or type of receiver and a cost factor.

Figure 4:
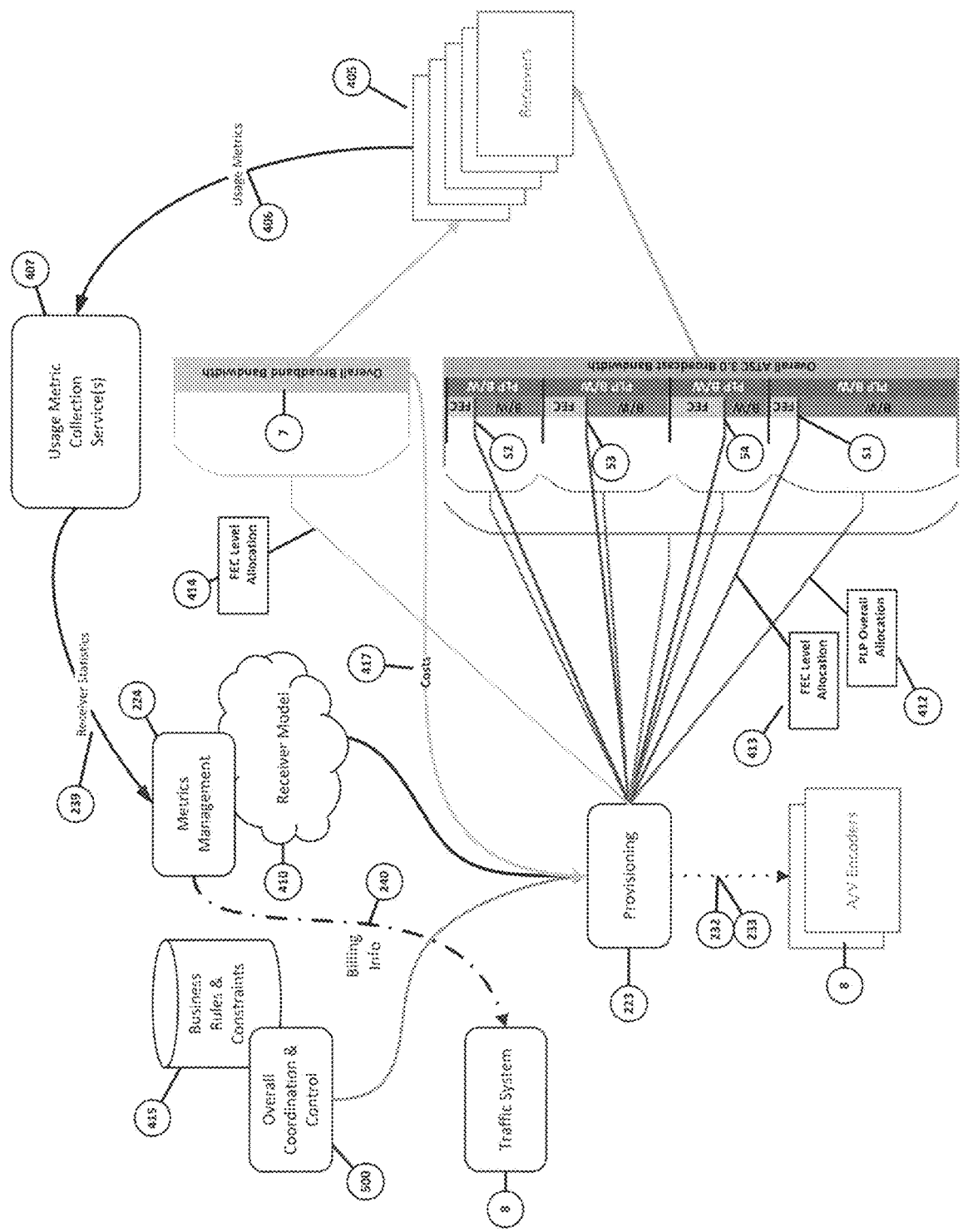
FIG. 4 is a system diagram illustrating a distribution channel optimization process performed by a broadcast services management platform according to embodiments of the present disclosure.

Referring generally to FIGS. 3, 4, 5a and 5b, the operation of a distribution optimization operation or algorithm performed by a BSMP will be described, with like reference numbers corresponding to the features set forth in the preceding figures. This description is provided in the context of an exemplary scenario wherein distribution over ATSC 3.0 and broadband channels is optimized in response to a rise in demand for broadcast data from mobile receivers (e.g. cellular phones). This rise in demand may be associated with, for example, that experienced during a typical lunch hour in a populated area. Referring primarily to FIG. 4, in this example, a nominal ATSC 3.0 broadcasting channel consists of 4 PLPs, including: 1) a low FEC PLP 51 with high bandwidth carrying a UHD video enhancement layer; 2) a moderate FEC PLP 52 with moderate bandwidth carrying base HD and immersive audio; 3) a high FEC PLP 53 with modest bandwidth carrying SD for mobile devices; and 4) a maximum FEC PLP 54 with minimal bandwidth carrying signaling and stereo audio. It should also be assumed that exemplary BSMP 4 is receiving constant receiver statistics or usage metrics 406 from usage metric collection services 407 through metrics collection services interface 239. Usage metrics 406 indicate, by way of example only, what devices or receivers 405 are viewing the programming and how that programming is being received.

As the lunch hour approaches in the broadcast designated market area (DMA), usage metrics 406 are received 301 (FIG. 3) by BSMP 4 via metrics collection services interface 239. In the exemplary scenario, an analysis 302 (FIG. 3) of these metrics 406 indicate an increase in the number mobile receivers 405 tuning to a broadcast. Received usage metrics 406 further reveals that some of mobile receivers 405 have indicate that they cannot receive the broadcast except by using the maximum FEC PLP or channel 54 and broadband channel 7. This directly results in more internet bit usage, thus driving up broadband delivery costs 417. Further, received usage metrics 406 indicate that there are comparatively few receivers using the HD and the associated UHD enhancement layer being delivered through PLP 51. Metrics management function 224 generates 303 (FIG. 3) an overall model 410 of receivers 405 that BSMP 4 is intended to address.

Within a distribution algorithm according to embodiments of the present disclosure, a comparison 304 (FIG. 3) between at least one of the usage metrics and a stored predetermined threshold value is performed. In the exemplary scenario, both increase in broadband cost 417 and the increasing number of mobile receivers 405 cause at least one predetermined threshold value to be exceeded. As a result, the distribution algorithm calculates 305 (FIG. 3) updated distribution characteristics or parameters given the changing environment in view of receiver model 410. In the exemplary scenario, this optimization process includes prioritizing the mobile receivers over the stationary, large screen receivers within receiver model 410. An optimized distribution scheme will be used to reconfigure 306 (FIG. 3) one or more distribution channels in order to more optimally target a given receiver type. This may be achieved by generating a control signal in BSMP 4 indicative of the optimal distribution characteristics, and transmitting (e.g. to broadcast gateway 241) that control signal to a control system (or subsystem of BSMP 4) for configuring and reconfiguring one or more of the distribution channels. These optimal distribution characteristics may be embodied as one or more alternate data rates associated with one or more of the distribution channels, or subchannels (e.g., PLPs). Consequently, in this scenario, there are not enough receivers to support the transmission of the UHD video enhancement layer over broadcast. and the bandwidth of corresponding PLP 51 is reduced toward zero. The content that was previously being distributed there is moved to broadband channel 7. In one embodiment, BSMP 4 may be configured to abandon the enhancement layer distribution outright if broadband delivery cost 417 is more expensive than the expected revenue return based on the number of receivers using it. The constraining parameters for this decision are supplied by overall coordination and control function 500 by, for example, examining business rules and constraints 415.

As PLP 51 used to transmit the enhancement layer is now no longer taking up bandwidth, provisioning function 223 of BSMP 4 can both increase FEC (via level allocation control 413) and expand the bandwidth (via overall allocation control 412) of high FEC PLP 53 targeting the mobile portion of receivers 705. Provisioning function 223 communicates with A/V encoders 8 through video encoder(s) interface 232 and audio encoder(s) interface 233 to begin creating a higher quality and, therefore, a higher bandwidth version of the content and begins sending HD with immersive audio over PLP 53. Provisioning function 223 further communicates with broadband channel 7 controlling, for example, a desired FEC level allocation via control signal 414.

Business rules 415 dictate how BSMP 4 responds to this new available bandwidth. For example, BSMP 4 may utilize this bandwidth to supply alternative services or interactive enhancements. The process of reducing high bandwidth/low FEC PLP 51 and increasing PLP 53 bandwidth favorable for reception by mobile devices is continued 307 (FIG. 3) until the system reaches an equilibrium, wherein predetermined usage thresholds are no longer exceeded. As a result, the broadcaster will reach many more mobile devices with their content resulting in much improved revenue projections. As described above, usage metrics 406 from receivers 405 will be provided as billing information through traffic system interface(s) 240 to traffic system 8 to record the expanded viewership.

As lunch time ends, the number of receivers of the mobile broadcast via PLP 53 will decrease as users return to work. Usage metrics 406 will slowly return to the state before the lunch-time mobile increase, and soon predetermined threshold value(s) will be crossed where the stationary, large screen receivers will outweigh the mobile devices. In this instance, the algorithm will begin moving bandwidth and FEC away from mobile-biased PLP 53 and back to enhancement layer PLP 51.

While the above represents a simplified example of the operation of an optimization algorithm according to embodiments of the present disclosure, other metrics and constraints may be utilized by the algorithm. For example, an assumed percentage of connected receivers may be utilized, as not all receivers will be connected. More specifically, as set forth above, the algorithm makes determinations based on receiver model 410. Statistical methods can be implemented to alter receiver model 410. For example, it cannot be assumed that all receivers are connected and opt-in to usage metric reporting, and receiver model 410 may be altered accordingly. Further, algorithms take into consideration encoding quality constraints. In one embodiment, business rule 415 may dictate, for example, that UHD will always be broadcast. Similarly, business rules 415 may constrain a minimum allowable compression rate to avoid visible compression artifacts.

Figure 5A:
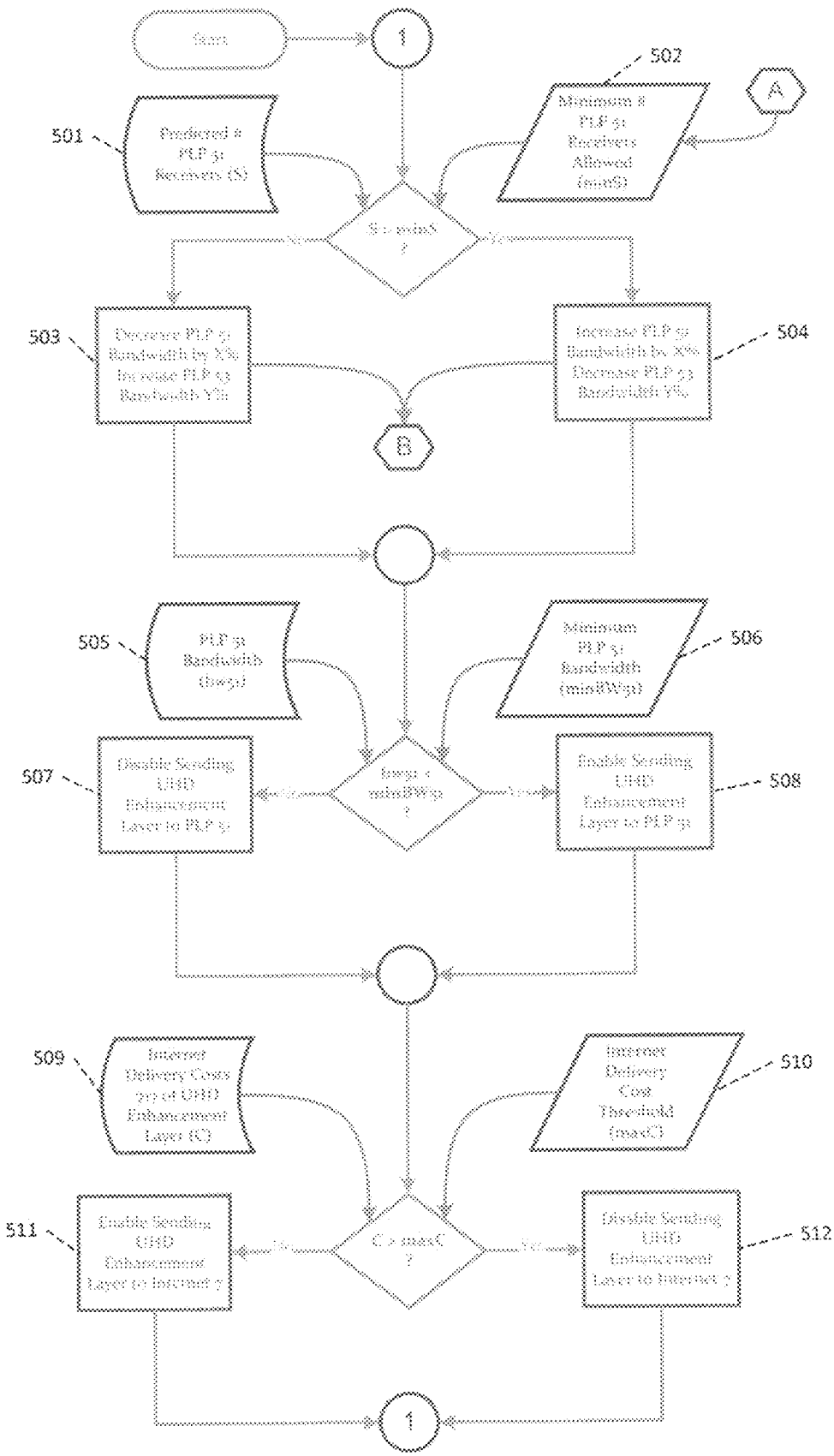
FIGS. 5A and 5B are a flow diagram illustrating a distribution channel optimization process performed by a broadcast services management platform according to embodiments of the present disclosure.
Figure 5B:
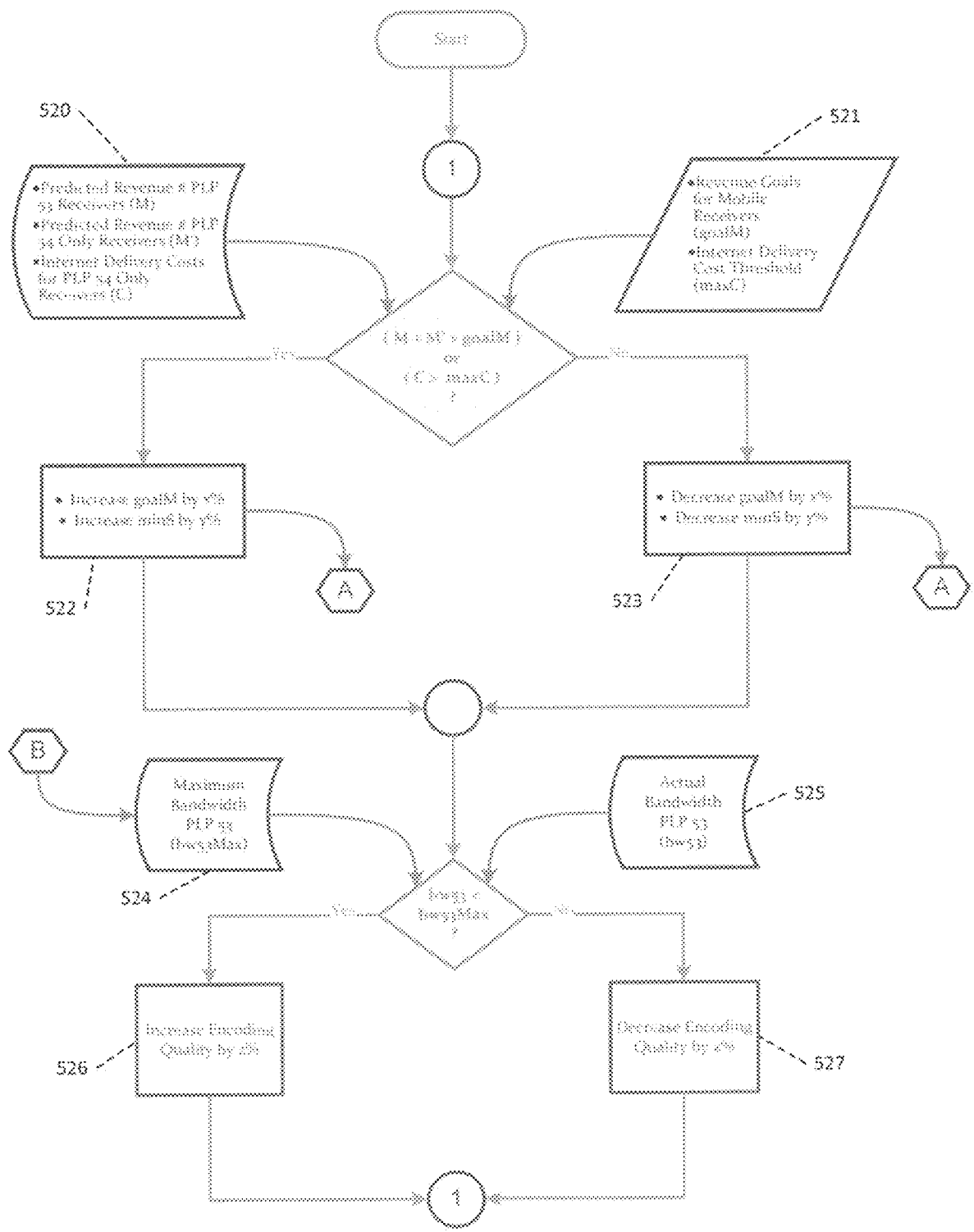

FIGS. 5A and 5B provide more detailed process diagrams illustrating an exemplary optimization algorithm according to embodiments of the present disclosure. As set forth above, these diagrams are merely representative, and do not illustrate all possible parameters that could be used as part of optimization processes according to embodiments of the present disclosure. Depending on the configured decision criteria, the algorithm can be adjusted to meet the particular business goals of the broadcaster. Embodiments of the present disclosure include algorithms which perform more complex processing, evaluating multiple parameters against multiple thresholds simultaneously, and adjusting thresholds based on incoming measured values as exemplified in FIGS. 5A and 5B.

FIG. 5A illustrates an exemplary algorithm used to manage the UHD video enhancement path PLP 51 as shown in FIG. 4, including decisions made in the example to move the UHD enhancement layer to broadband channel 7 and back again. FIG. 5B provides an algorithm useful for managing the expansion of mobile device distribution path PLP 53 of FIG. 4. As shown in the figures, the use of curved data flow identifiers is intended to represent an external data value, while the use of parallelograms indicate data sourced from business rules and constraints 415. It should further be understood that the flow diagrams of FIGS. 5A and 5B operate in parallel, with the process of FIG. 5B tied to that of FIG. 5A using a threshold value 502 (minS) from the minimum number of receivers using PLP 51. This connection is depicted using the hexagonal connector A. Hexagonal connector B indicates that the process of FIG. 5A is modifying an input parameter, namely, a maximum PLP 53 bandwidth 524 (bw53Max).

FIG. 5A illustrates management of PLP 51 both when decreasing bandwidth and, in some scenarios, transitioning to broadband distribution path or channel 7, and when increasing bandwidth. The initial decision compares the predicted number of receivers using PLP 51 501 (S) and the threshold defined as the minimum number of PLP 51 receivers allowed 502 (minS). If there are more predicted receivers 501 than the minimum number of receivers 502, the process proceeds to determine if the bandwidth of PLP 51 can be incrementally increased by a percentage (X %), while decreasing the bandwidth of PLP 53 by a percentage (Y %) 504. In the alternative, if the number of predicted number of receivers using PLP 51 501 is less than the minimum allowed 502, the system will decrease the bandwidth of PLP 51 by some percentage (X %), while increasing the bandwidth of PLP 53 by a percentage (Y %) in process step 507. Note, the maximum bandwidth of PLP 53 is connected to the management function of PLP 53 as part of process steps 503 and 504.

As process steps 503 and 504 are operative to change bandwidth of PLP 51 503 (bw51), at some point bandwidth 503 will fall below the minimum threshold PLP 51 bandwidth threshold 506 (minBW51). If bandwidth 505 is greater than minimum bandwidth 506, the system will confirm that the UHD enhancement layer is enabled via PLP 51 distribution channel 598. As the algorithm repeats, the criteria for increasing or decreasing bandwidth may changed based on the management algorithm of PLP 53, thus resulting in bandwidth 505 either exceeding or falling below minimum threshold 506. When bandwidth 505 does finally fall below minimum 506, the system will disable the UHD enhancement data through PLP 51 as shown in step 507.

The next operation determines whether the costs of sending the UHD enhancement layer 509 (C) over broadband channel 7 are over a predetermined maximum 510 (maxC). Note that costs 509 are calculated using the overall broadband delivery costs 417 and the expected bandwidth of the UHD enhancement layer. If costs 509 exceed the maximum, the system will disable transmitting the UHD enhancement layer of broadband channel 7 in step 512. Otherwise, the system will enable sending the UHD enhancement layer data over broadband channel 7 in step 511.

FIG. 5B illustrates a process flow for managing PLP 53 acting as the primary distribution channel targeting mobile receivers. Exemplary metrics 520 utilized by the system and gleaned from the environment include: 1) predicted revenue from the PLP 51 receivers M; 2) predicted revenue from PLP 54 only receivers M'; and 3) internet delivery costs for PLP 54 only receivers C. As PLP 54 carries only signaling, any ATSC 3.0 data is provided via broadband channel 7. Internal thresholds represented in block 521 include revenue goals for mobile receivers (goalM) and a broadband delivery cost threshold (maxC). BSMP 4, and more specifically provisioning function 223, compares the input values against these thresholds. In this case, if the thresholds are exceeded, the system will push the revenue goals higher by a percentage increment and increase the lower bound for the number of PLP 51 stations (minS) by another percentage increment in step 522. Note that the value of minS is utilized by PLP 51 process of FIG. 5A as denoted by connector A. Generally, as minS rises, the number of receivers using UHD enhancements must increase keep pace and justify the use all of the bandwidth of PLP 51. Once the threshold is crossed, as set forth in FIG. 5A, the system will begin lowering the bandwidth used by PLP 51, and consequently increase the bandwidth available to PLP 53 that is checked in the next test. However, if the thresholds are not exceeded, the opposite process is initiated, wherein the effective priority of the mobile receivers decreases (by decreasing goalM) and the total allows UHD enhancement receivers is permitted to grow by reducing the minimum number of receivers (minS) in process step 523.

Finally, the algorithm is configured to determine whether the actual bandwidth of PLP 53 525 (bw53) is less than the maximum bandwidth of PLP 53 (bw53Max) allowed is step 524. Note that the maximum bandwidth is changed by PLP 51 management process set forth in FIG. 5A, as bandwidth is released by PLP 51. As bandwidth is made available, the system will proceed to improve the encoding quality by some percentage (Z %) 526, or decrease the quality as bandwidth is removed 527.

While the above embodiments are described as performing one or more discrete thresholding tests or comparisons, embodiments of the present disclosure may implement forms of more continuous adjustment. This may be achieved by, for example, neural network or genetic technology using active feedback to "reward" an algorithm for a positive result (e.g., improved revenue).

Figure 6:
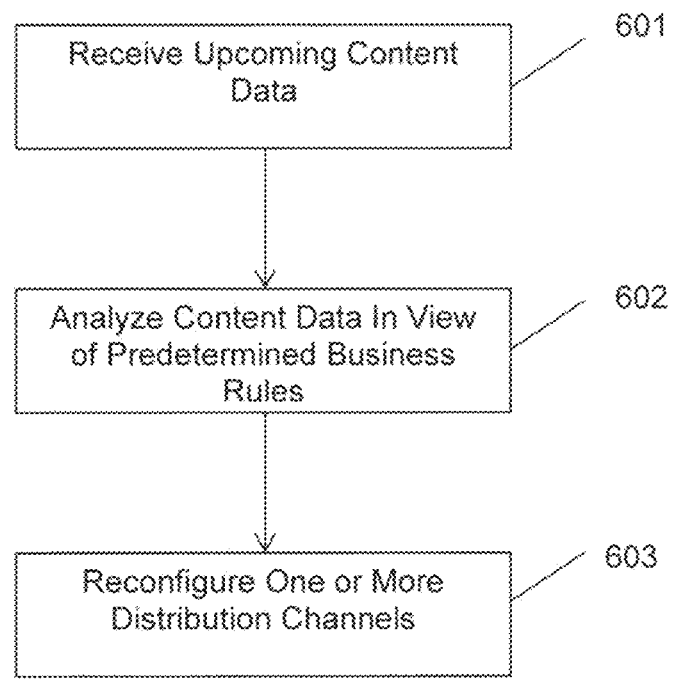
FIG. 6 is a flow diagram illustrating another distribution channel optimization process performed by a broadcast services management platform according to embodiments of the present disclosure.

Referring generally to FIG. 6, a BSMP according to embodiments of the present disclosure is further configured to advantageously pre-position content in order to improve system efficiency. In the exemplary embodiment, an ATSC 3.0 platform is assumed to broadcast over PLPs initially configured as follows: 1) a low FEC PLP with high bandwidth carrying a UHD video enhancement layer; 2) a moderate FEC PLP with moderate bandwidth carrying base HD and immersive audio; 3) a high FEC PLP with modest bandwidth carrying SD for mobile devices; and 4) a maximum FEC PLP with minimal bandwidth carrying signaling and stereo audio. As time progresses in the schedule, the BSMP receives 601 data indicating that a set of targeted advertising opportunities are coming up in the near future. Using pre-stored business rules, the BSMP analyzes 602 the content and determines that the targeted content is much higher value than the base content currently being distributed. In response, the BSMP operates to reconfigure 603 the PLPs as follows: 1) a modest FEC PLP with moderate bandwidth carrying a HD/HDR video and immersive audio; 2) a modest FEC PLP with moderate bandwidth carrying data for targeted advertising; 3) a high FEC PLP with modest bandwidth carrying SD for mobile devices; and 4) a maximum FEC PLP with minimal bandwidth carrying signaling and stereo audio Unlike the previous example, this configuration would not be derived from various predetermined parameter thresholds but, is driven by the single factor of targeted advertising resulting in the dedication of an entire PLP to carry content for the replacement ads. Such business rules and their consequences are pre-programmed into the system. The BSMP may be configured to distribute targeted content to three different locations: 1) to origin servers in the cloud; 2) to caches in the receivers; and 3) in the broadcast where the content can be played directly from the distribution channel without caching. For the origin server locations, the system would publish the targeted ad content to the cloud as a matter of course. The number of receivers able to receive the broadcast and able to cache content ahead of time will directly inform the system what to do and when.

Figure 7:
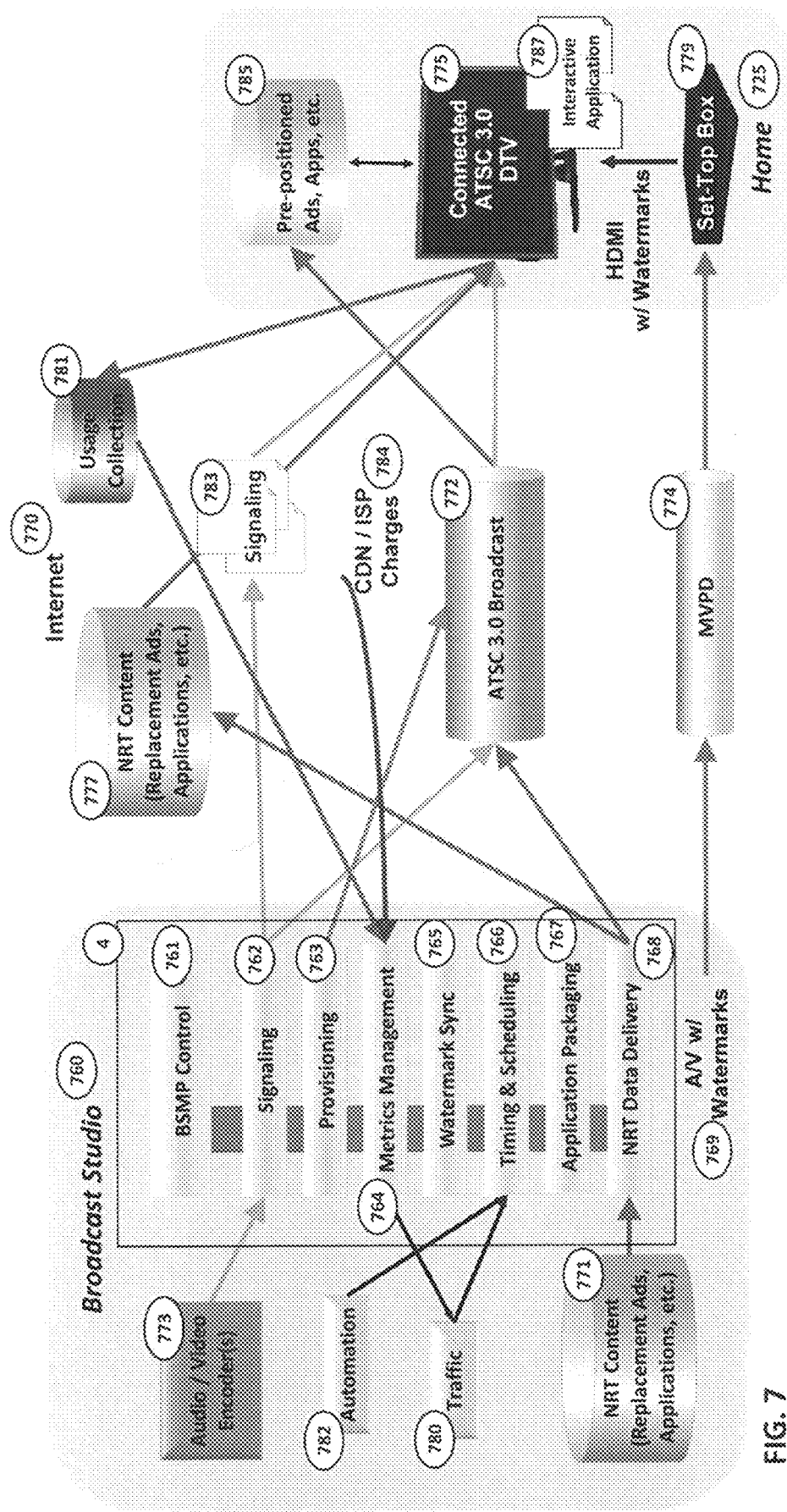
FIG. 7 is a system diagram illustrating a targeted advertising process performed by a broadcast services management platform according to embodiments of the present disclosure.

Referring generally to FIG. 7, a flow diagram illustrating an exemplary targeted advertising task performed by addressable content management application or module 216 (FIG. 2) of BSMP 4 is shown. In this scenario, targeted advertising allows receivers to replace certain advertising with other alternative advertising "targeted at" the viewer. In this environment, a viewer's receiver operates an application (e.g. a web page with JavaScript code) to determine what the appropriate ad may be and when to cause it to be shown as an alternative to the default ad. The application informs the receiver what video and audio to play at the appropriate time to replace the default advertising.

The exemplary environment consists of a broadcast studio 760, a broadband distribution channel 770, an ATSC 3.0 broadcast distribution channel 772, an MVPD distribution channel 774, and a home 725. Home 725 represents an aggregation of many homes and corresponding receivers. In a typical environment, a connected ATSC 3.0 digital TV 775 would be connected to only one or two of distribution channels 770,772,774. For example, many homes in the U.S. receive their content via a managed network provider such as a cable, telco or satellite operator and as such utilize a set-top box 779 along with an internet connection, however, without ATSC 3.0 broadcast. Those that did not have cable typically have over-the-air reception of ATSC 3.0 broadcast and an internet connection. BSMP 4 according to embodiments of the present disclosure is configured to optimize delivery in view of these combinations and scenarios.

Broadcast studio 760 generally corresponds to the distribution section 1 of FIG. 1. The variously numbered components of BSMP 4 shown in broadcast studio 760 correspond directly to the components shown in core function layer 220 in shown in FIG. 2. BSMP control 761 corresponds to overall coordination and control module 500 of FIG. 2.

In the exemplary illustrated scenario, it is presumed that BSMP 4 has been operating for some indeterminate time and that a set of predefined business rules stored therein. In this way, an initial startup and configuration of BSMP 4 and impacted environment are given. In the normal course of operation, a traffic system 780 detects that an advertising break is approaching on its schedule and signals an automation system 782 with the various components need to be signaled. Generally, a traffic schedule would be known at the beginning of the day but late changes may occur or business rules may change requiring updates to both traffic system 780 and automation system 782. Either the traffic system 780 or automation systems 762 signal the timing and scheduling core function 766 through their respective device interfaces as detailed in the FIG. 2 discussion above.

Timing and scheduling function 766 communications with BSMP control 761 and the addressable content management application 216 (FIG. 2) to set up activities and functions needed to accomplish the targeted advertising task. Note that the addressable content management application 216 would have set up various content and components ahead of time and notified traffic system 780 and automation system 782 that targeted advertising was supported.

BSMP control 761 and the addressable content management application 216 communicate with the signaling function 762 to indicate that a targeted ad is about to happen. Signaling function 762 creates the appropriate tables and metadata and publishes them to both broadcast distribution channel 772 and broadband distribution channel 770. Signaling files 783 reside on a broadcaster's server on the internet where they are made available to all consumer devices that can access them. In addition, at the appropriate lead time, signaling function 762 notifies audio/video encoder(s) 773 to modify their output to enable the swap of content at the appropriate time.

While signaling function 762 is operating, BSMP 4 is configured to use watermark sync function 765 to synchronize the contents of the watermarks to match the current signaling. The watermark mechanisms are typically used in situations where the receiving device does not have access to the OTA broadcast. The watermark system works by adding data to the content which is not visually or audibly detectable. As described above, BSMP 4 does not insert the watermark but communicates with the watermark inserters to provide the information needed to obtain necessary signaling files 783. The watermark inserter (not shown) encodes the watermark information into content essence streams 769 which are then passed to the consumer devices represented in this example by connected ATSC 3.0 DTV 775. Note that set-top box 779 decodes the MVPD delivery into an HDMI feed. DTV 775 decodes the watermarks, either video or audio, determines the location of the replacement signaling files 783 and obtains it from the internet. DTV 775 now has the same signaling information it would have received if it had been connected to the broadcast.

Provisioning function 763 works in parallel with signaling function 762 and watermark sync function 765 to configure the ATSC 3.0 broadcast distribution pipes as well as audio/video encoder(s) 773 and NRT content cache 771 to determine how much bandwidth is required and how much bandwidth can be accommodated. Provisioning function 763 utilizes BSMP control 761 and information about business rules, historical trends and other metrics gathered over time to create an optimal broadcast distribution channel. This provisioning information is communicated to NRT data delivery function 768 which begins transmitting the necessary content via both broadband distribution channel 770 via NRT content cache 771 and over ATSC 3.0 broadcast distribution channel 772. Connected ATSC 3.0 DTVs 775 that can do so will cache the content received over the air to a pre-positioned ads cache 785.

Based on the various factors including, but not limited to, business rules, delivery costs, available bandwidth, known receiver availability and other metrics, NRT data delivery function 768 may choose to send some data over the broadcast, some data to the internet or both. NRT data delivery function 768 must be aware of the schedule to prioritize receipt of content before it is needed by the receiver, that is, before the time of the ad replacement. NRT data delivery function 768 is further configured to schedule the files comprising interactive application 787 so that it will be available to DTV 775 for execution at the appropriate time. Application packaging function 767 is used to create interactive application 787 and making it available for delivery. In addition, application packaging function 767 also informs signaling function 762 to produce the correct signaling to inform receivers what interactive application 787 to load.

At the time of the ad replacement, interactive application 787 works with connected ATSC 3.0 DTV 775 to determine which content to use and when. Interactive application 787 is configured to determine if the content is available in pre-positioned cache 785, from broadcast over distribution channel 772 or from broadband distribution channel 770. Interactive application 787 is configured to determine which content to use based on local parameters and instructs DTV 775 which to play by providing a location.

BSMP 4 is further configured to determine how many receivers are using the various distribution channels through usage metrics accumulated by usage collection database 781 and reporting by interactive applications 787 tasked with performing the targeted advertising ad selection. Note that interactive applications 787 may utilize whatever proprietary communications to report whatever information is useful to BSMP 4. Using these gathered metrics, BSMP 4 can optimize delivery of future targeted advertising or change the underlying distribution over time.

Usage database 781 is queried periodically by a metrics management function 764 of BSMP 4. In addition, this metrics management system may also collect billing information and charges from the ISP and content delivery networks (CDNs) used to transmit content over the Internet. Metrics management function 764 analyzes these metrics and changes parameters and historical trends appropriately. It also reports usage of targeted advertising back to traffic system 780 for billing purposes.

Figure 8:
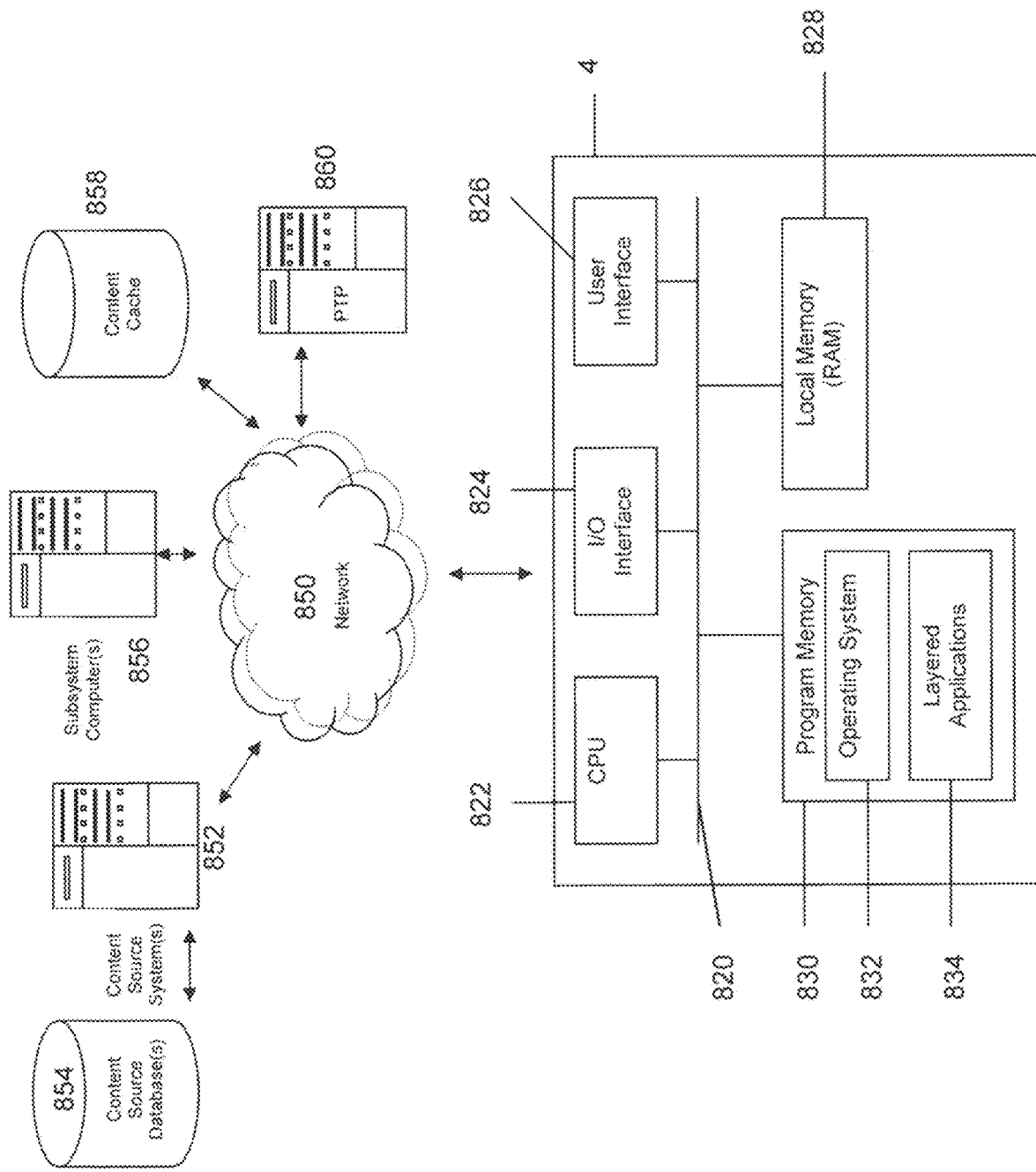
FIG. 8 is a simplified system diagram illustrating a broadcast services management platform and surrounding environment according to embodiments of the present disclosure.

FIG. 8 provides a more detailed view of exemplary hardware which may be used to implement BSMP 4 as set forth in the above description. BSMP 4 includes a data bus 820 providing communication among system components. One or more computer processors, designated by central processing unit (CPU) 822, is in communication via data bus 820 with components including program memory 830, local memory 828, user interface(s) 826, and input/output interface(s) 824. Program memory 830 stores programs including an operating system (OS) 832, which manages the computer hardware and provides common services for efficient execution of various logic circuitry including hardware, software and/or programs. Program memory 830 further stores one or more programs 834, which include computer-executable instructions to execute rules to perform the processing described herein, such as the optimized distribution of content and other data over and between the plurality of discrete distribution channels, as well as the control of communications between BSMP 4 and other external devices or databases. Programs 834 may represent each of the applications or modules shown and described above with respect to FIG. 2. Processor 822 (or CPU) carries out the instructions of computer programs, which operates and/or controls at least a portion of the functionality of BSMP 4. Program instructions may be loaded into local memory 828 for efficient and high-speed execution by CPU 822. Programs may be arranged in one or more modules, as set forth above, and functionality of programs may be implemented in program code that may be arranged as one or more programs or modules, which need not be stored on a same memory device, or executed by a single CPU.

BSMP 4 further includes device input/output interface 824 configured to receive and output data and information to and/or from BSMP 4 from and/or to peripheral devices and networks operatively coupled to the system. Such networks may include exemplary internet network 850. I/O interface 824 manages communications among, for example, a content source system 852 in communication with one or more content source databases 854, external devices (e.g., encoders, watermark inserters) embodied as subsystem computers 856, remote content caches 858, PTP 860 and each distribution channel (not shown) associated with the system. I/O interface 824 may include a query interface configured to accept and parse requests from these external systems, and pass those requests to CPU 822 for processing.

Program memory 830 may include one or more of any form of data storage device including but not limited to electronic, magnetic, optical recording mechanisms, combinations thereof or any other form of memory device capable of storing data. CPU 822 may be in the form of one or more computer processors, or may be in such forms as a distributed computing system, a centralized computing system, a network server with communication modules and other processors, or nearly any other automated information processing system capable of executing instructions stored in program memory.

Each or any combination of the modules and components shown in FIG. 8 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure.

The following table provides a listing of exemplary constraints including usage metrics and business rules that may be utilized by embodiments of the present disclosure for performing the functions described herein. These factors can be categorized as fixed constraints C, dynamic thresholds that may be altered by a system T, parameters or "control knob" values P, and metric or measurements/external information M. As shown, the table further categorizes these factors as they relate to, for example, a particular distribution channel type or a particular subset of hardware.

TABLE 1

| Exemplary Constraint | Type | Description/Comment |
| --- | --- | --- |
| Distribution Channel Characteristics | | |
| Multiple Channel Characteristics—Broadcasters may have multiple transmitters of same type | | |
| Total Available Channels | C | A list of available distribution channels and their respective types |
| Channel Sharing Rules | C | A set of rules that determine the characteristics of individual channels based on contractual sharing agreements. |
| ATSC 3.0 OTA Broadcast Distribution | | |
| Overall Bandwidth | C | 6 Mhz defines maximum number of bits that can be used for all data sent over broadcast including FEC bits. |
| Max Number of PLPs | T | Total number of simultaneous PLPs allowed in broadcast |
| Actual Number of PLPs | P | Selected number of simultaneous PLPs |
| PLP Penetration | T | The theoretical limits regarding where the signal with a given FEC set point can reach. |
| Overall PLP Bandwidth | T | Maximum Bandwidth of a given PLP |
| Content Mapping | P | Selects which content is placed on which PLP |
| Component Mapping | P | Selects which component types go on which PLPs |
| Priority of component reception | T | Higher priority requires higher penetration |
| Delivery Schedule | P | Schedule of which components and content get delivered when |
| Broadband (Internet) Distribution | | |
| Overall Bandwidth | C | Maximum limit of transmission to origin servers |
| Content Mapping | P | Selects which content is placed on the distribution channel. In this case, also includes required content that would not 'fit' on other distribution channels. |
| Component Type | P | Selects which component types are placed on distribution channel for given content. |
| Storage Cost | M | Cost of storing content on CDN |
| Distribution Cost | M | Cost of delivering content via broadband |
| Content Life Span | P | Selects how long content should be made available on broadband channel. |
| Delivery Schedule | P | Schedule of which components and content get delivered when |
| ATSC 1.0 OTA Broadcast Distribution | | |
| Overall Bandwidth | C | Hard limit of 19.4 Mb/s |
| Content Mapping | P | Selects which content is placed on the distribution channel. |
| Selected Component Types | P | Selects which component types are placed on distribution channel for given content. |
| Priority of component delivery | T | Priority of component delivery can change on scheduled basis |
| Delivery Schedule | P | Schedule of which components and content get delivered when |
| MVPD Broadcast Distribution | | |
| Overall Bandwidth | C | Bandwidth constrained by physical transmission media and possibly by contract. |
| Content Mapping | P | Selects which content is placed on the distribution channel. |
| Selected Component Types | P | Selects which component types are placed on distribution channel for given services. May actually be constrained by contract. |

TABLE 1-continued

| Exemplary Constraint | Type | Description/Comment |
| --- | --- | --- |
| Priority of component delivery | T | Priority of component delivery can change on scheduled basis |
| Delivery Schedule | P | Schedule of which components and content get delivered when |
| Content Characteristics | | |
| (Content includes but is not limited to, program segments ads, targeted ads, promos, components etc.) | | |
| Current Available Bandwidth | P | The current bandwidth of the content. May be multiple bandwidths available for each content element. |
| Maximum Bandwidth | T | Maximum Bandwidth allowed for live content |
| Minimum Bandwidth | T | Minimum Bandwidth allowed for live content |
| Encoding Type | P | Distribution channels frequently restrict encoding type. For example, ATSC 3.0 only supports HEVC-encoded video. |
| Component Type | C | The type of essence component, Audio, Video, CC, etc. |
| Component Priority | T | The priority of a given component |
| Component Rating | C | The parental rating of a content element |
| Component Language | C | The language of the particular content element |
| Component Cost | C | The cost incurred if the component is distributed. For example, if there are license fees for a French audio track it would only be sent if enough French-speakers were going to watch it. |
| Service Priority | T | The relative priority of the service against other managed services |
| Allowed content distribution | C | Some content cannot be distributed over certain channels due to licensing issues. |
| Service Cost | C | The cost of distributing content at a given time. May be different for each distribution channel. |
| Predicted Content Revenue | T | The predicted income of airing content at a given time. If possible can be based on trends and historical info. |
| Actual Content Revenue | M | The actual income of airing content at a given time (measured after the time). Uses measured users from receiver usage and audience measurement services. |
| Studio Device Control | | |
| Video Encoder | | |
| Active Input Channels | M | Number of active input channels |
| Input Channel Type | M | Type of unencoded video data being received on an input |
| Maximum Simultaneous Outputs | C | Defined by license or hardware |
| Configured Number of Outputs | P | Selects how many outputs are required |
| Available Encoding formats | C | HEVC, AVC, MPEG2, etc. |
| Select Encoding Format per Output | P | One of HEVC, AVC, MPEG2, etc. |
| Frame Rate per Output | P | |
| Bitrate per Output | P | May be derived from quality requirements. May need to set max and min if variable bit rate defined. |
| Audio Encoder | | |
| Active Input Channels | M | Number of active input channels |
| Input Channel Type | M | Type of unencoded audio data being received on an input |
| Maximum Simultaneous Outputs | C | Defined by license or hardware |
| Configured Number of Outputs | P | Selects how many outputs are required |
| Available Encoding formats | C | AAC, AC-3, AC-4, etc. |
| Select Encoding Format per Output | P | One of AAC, AC-3, AC-4, etc. |
| Audio Feature Capabilities | C | 5.1 surround, stereo, immersive, etc. |
| Audio Feature Selection | P | 5.1 surround, stereo, immersive, etc. |

TABLE 1-continued

| Exemplary Constraint | Type | Description/Comment |
|---|---|---|
| Frame Rate per Output | P | |
| Bitrate per Output | P | May be derived from quality requirements. May need to set max and min if variable bit rate defined. |
| Broadcast Gateway | | |
| Maximum PLPs Supported | C | Total PLPs the unit can support |
| Number of PLPs | P | Configured number of PLPs |
| Define PLP Set Point | P | Selects one of multiple configuration set points for FEC and bandwidth. |
| Other Device Controls | | |
| Current watermark data | P | Sent to watermark inserters to be included in video and audio watermarks. |
| Receiver Characteristics | | |
| Receiver Pool Characteristics | | |
| Brand/Model Totals | M | Count of specific brand or model |
| Type Totals | M | Count of each type of receiver |
| Location | M | Map of where receivers are. |
| Cache Capacity Totals | M | Cache capacity grouped by size and count of receivers per size. Allows system to target groups of receivers by cache size. |
| Distribution Channel Usage | M | Number of receivers using each distribution channel |
| Language Totals | M | Total of receivers are using various languages |
| V-Chip Usage | M | Number of receivers restricted by each parental rating level |
| Individual Receiver Characteristics | | |
| Brand/Model | C | |
| Location | M | Receivers can be moved over time or may be mobile. |
| Type | C | Type of receiver (stationary TV, mobile phone, tablet, etc) |
| Cache Capacity | M | Total cache size over time |
| Distribution Channels Used | M | List of distribution channels that have been used. |
| Distribution Channels Available | M | List of available distribution channels that could be used. |
| Language Usage | M | What language is selected for content |
| V-Chip Restrictions | M | V-Chip Limitations—Why send R-rated content if not enough people can watch it? |
| User Characteristics | | |
| Age Group | M | Count of users per age group |
| Usage duration | M | Duration of watching content |
| Distribution Channel Usage | M | How users are receiving content from each distribution channel. Related to receiver distribution channel usage. |

While the foregoing invention has been described with reference to the above-described embodiment, various modifications and changes, including utilizing any of the above Distribution Channel Characteristics, can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for selectively controlling the distribution of media content to at least one client device over a broadcast distribution channel, comprising:
   one or more broadcast management processors;
   a memory in communication with the one or more broadcast management processors and storing program instructions, the one or more broadcast management processors operative with the program instructions to:
   receive a usage metric corresponding to at least one of (i) a characteristic associated with the at least one client device and (ii) a characteristic associated with at least one of a plurality of physical layer pipes (PLPs) defined by the broadcast distribution channel;
   access a data rate associated with at least one of the plurality of PLPs;
   determine an alternate data rate associated with the at least one of the plurality of PLPs based on the received usage metric; and
   generate, in response to the usage metric, at least one distribution control signal indicative of the alternate data rate associated with the at least one of the plurality of PLPs, wherein the at least one distribution control signal causes a system sub-component to alter and balance the characteristics of the plurality of physical layer pipes (PLPs).

2. The system of claim 1, wherein the one or more broadcast management processors are further operative to compare the received usage metric to at least one predetermined threshold value, and wherein the alternate data rate is determined in response to the received usage metric exceeding the predetermined threshold value.

3. The system of claim 1, wherein the alternate data rate associated with the at least one of the plurality of PLPs is achieved by altering one of compression and encoding characteristics of the media content distributed over the at least one of the plurality of PLPs.

4. The system of claim 1, wherein the broadcast distribution channel includes one of a broadband distribution channel and an over-the-air (OTA) broadcast distribution channel.

5. The system of claim 4, wherein the broadcast distribution channel further includes a multichannel video programming distributor (MVPD) distribution channel, and wherein the plurality of PLPs comprises a digital broadcast distribution channel operating under Advanced Television Systems Committee (ATSC) 3.0 protocols.

6. The system of claim 4, wherein the usage metric corresponding to the characteristic associated with one of the plurality of PLPs comprises a cost factor associated with the broadband distribution channel.

7. The system of claim 1, wherein the usage metric corresponding to the characteristic associated with the at least one client device comprises an indication of a number of client devices attempting to receive the media content.

8. The system of claim 7, wherein the usage metric corresponding to the characteristic associated with the at least one client device further comprises an indication of a type of the at least one client device.

9. The system of claim 1, wherein the determination of the alternate data rate associated with at least one of the plurality of PLPs is further based on at least one predetermined business rule.

10. The system of claim 1, wherein the broadcast management processor is further operative with the program instructions to selectively preposition content data within a content cache associated with the at least one client device.

11. The system of claim 10, wherein the broadcast management processor being further operative with the program instructions to selectively preposition content data with the content cache comprises selectively prepositioning content having data indicative of a low time sensitivity value.

12. A system for selectively distributing content to a plurality of client devices over a plurality of distribution channels including a broadband distribution channel and an over-the-air (OTA) broadcast distribution channel, the system comprising:
one or more management processors;
a memory in communication with the one or more management processors and storing program instructions, the one or more management processors operative with the program instructions to:
receive usage metrics associated with at least one client device;
receive data associated with a characteristic of one of the plurality of distribution channels;
access a current distribution scheme;
determine an alternate distribution scheme for distributing content over the plurality of distribution channels using the received usage metrics and data associated with a characteristic of one of the plurality of distribution channels; and
generate, in response to the usage metric, multiple distribution control signals that cause changes to multiple distribution channels indicative of the alternate distribution scheme.

13. The system of claim 12, wherein the one or more management processors are further operative to compare the received usage metric to at least one predetermined threshold value, and wherein the at least one distribution control signal is generated in response to the received usage metric exceeding the predetermined threshold value.

14. The system of claim 12, wherein the distribution control signal causes a system component to, responsive to receipt of the distribution control signal, alter at least one of:
a quality of the media content distributed over at least one of the plurality of distribution channels;
the distribution channel or channels utilized to distribute the content; and
a characteristic of at least one of the plurality of distribution channels.

15. The system of claim 12, wherein the plurality of distribution channels include a broadband distribution channel operating under Advanced Television Systems Committee (ATSC) 3.0 protocols and an over-the-air (OTA) broadcast distribution channel, and wherein the at least one distribution control signal causes a system component to alter a characteristic of at least one of a plurality of physical layer pipes (PLPs) defined by the broadcast distribution channel.

16. The system of claim 15, wherein the usage metric corresponding to the characteristic associated with one of the plurality of distribution channels comprises a cost factor associated with the broadband distribution channel, and wherein the usage metric corresponding to the characteristic associated with the at least one client device includes comprises an indication of the number of client devices attempting to receive the media content.

17. A computer-implemented method for selectively distributing content to at least one client device over a broadcast distribution channel, the method comprising:
receiving, by one or more broadcast management processors, a usage metric corresponding to a characteristic associated with the at least one client device and a characteristic associated with at least one of a plurality of physical layer pipes (PLPs) defined by the broadcast distribution channel;
accessing, by the one or more broadcast management processors, a data rate associated with the at least one of the plurality of PLPs;
determining, by the one or more broadcast management processors, an alternate data rate associated with at least one of the plurality of PLPs based on the received usage metric; and
generating, in response to the usage metric, by the one or more broadcast management processors, at least one distribution control signal that causes a system subcomponent to alter and balance the characteristics of the plurality of PLPs.

18. The method of claim 17, wherein the usage metric corresponding to the characteristic associated with the at least one client device comprises an indication of the number of client devices attempting to receive the content.

19. A client device for selectively controlling the selection of a physical layer pipe of a broadcast distribution channel that will be used to receive media content, comprising:
one or more client device processors;
a memory in communication with the processors and storing program instructions, the one or more processors operative with the program instructions to:
provide, to a remotely-located broadcast management processor, a usage metric corresponding to at least one of a characteristic associated with the client device and a characteristic associated with the PLP, wherein said usage metric exceeds a predetermined threshold value associated with current characteristics of the PLP;
generate, in response to the usage metric, at least one distribution control signal that causes a system subcomponent to alter and balance the characteristics of the plurality of PLPs; and
receive said media content via the altered PLPs.

20. The system of claim 1, wherein the at least one distribution control signal causes the system sub-component to alter and balance at least one of: a) bandwidth; and b) forward error control (FEC) level allocation, of at least one of the plurality of physical layer pipes (PLPs) defined by the broadcast distribution channel.

* * * * *